(12) United States Patent
Ratica et al.

(10) Patent No.: US 10,567,335 B2
(45) Date of Patent: *Feb. 18, 2020

(54) SYSTEM ARCHITECTURE FOR DMZ EXTERNAL IP ADDRESSES

(71) Applicant: CardinalCommerce Corporation, Mentor, OH (US)

(72) Inventors: Adam Ratica, Mentor, OH (US); Matthew Yucha, Mentor, OH (US); Marcus L. Weidner, Willowick, OH (US); Andrew T. Heiss, Mentor, OH (US); Christopher A. Baird, South Euclid, OH (US); John M. Schick, IV, Concord, OH (US)

(73) Assignee: CardinalCommerce Corporation, Mentor, OH (US)

( * ) Notice: Subject to any disclaimer, the term of this patent is extended or adjusted under 35 U.S.C. 154(b) by 6 days.

This patent is subject to a terminal disclaimer.

(21) Appl. No.: 16/152,510

(22) Filed: Oct. 5, 2018

(65) Prior Publication Data

US 2019/0036872 A1 Jan. 31, 2019

Related U.S. Application Data

(63) Continuation of application No. 13/298,811, filed on Nov. 17, 2011, now Pat. No. 10,116,617.

(Continued)

(51) Int. Cl.
*H04L 29/12* (2006.01)

(52) U.S. Cl.
CPC ...... *H04L 61/1511* (2013.01); *H04L 61/2503* (2013.01); *H04L 61/2507* (2013.01); *H04L 61/2514* (2013.01); *H04L 61/2567* (2013.01)

(58) Field of Classification Search
CPC ............ H04L 61/2514; H04L 61/2567; H04L 61/2503; H04L 61/2507; H04L 61/1511; H04L 61/2596

See application file for complete search history.

(56) References Cited

U.S. PATENT DOCUMENTS

| | | | | |
|---|---|---|---|---|
| 6,954,790 B2 * | 10/2005 | Forslow | .............. | H04L 63/0227 455/461 |
| 7,051,002 B2 * | 5/2006 | Keresman, III | ....... | G06Q 20/02 705/42 |

(Continued)

OTHER PUBLICATIONS

"Payment Card Industry (PCT) Data Security Standard, Requirements and Security Assessment Procedures", PCI Security Standards Council, Version 1.2. Oct. 2008.*

(Continued)

*Primary Examiner* — Kambiz Zand
*Assistant Examiner* — Tongoc Tran
(74) *Attorney, Agent, or Firm* — The Webb Law Firm

(57) ABSTRACT

A system of a first network, which is intermediate a second network and a third network, connects a host of the second network to a host of the third network. The system includes at least one processor programmed to receive a domain name service (DNS) request for a hostname corresponding to the host of the third network from the host of the second network. An internet protocol (IP) address of the first network allocated and an IP address of the host of the third network is determined from the hostname. The allocated IP address is mapped to the determined IP address and the allocated IP address is returned to the host of the second network in response to the DNS request.

20 Claims, 2 Drawing Sheets

Related U.S. Application Data

(60) Provisional application No. 61/414,496, filed on Nov. 17, 2010.

(56) References Cited

U.S. PATENT DOCUMENTS

| | | | | | |
|---|---|---|---|---|---|
| 7,299,353 | B2* | 11/2007 | Le Pennec | ............ | H04L 41/042 713/159 |
| 7,421,499 | B1* | 9/2008 | Lanahan | ................. | H04L 29/06 709/220 |
| 7,693,783 | B2* | 4/2010 | Balasubramanian | .. | G06Q 20/02 235/380 |
| 8,005,981 | B2* | 8/2011 | Tuck | ................. | H04L 29/12066 709/238 |
| 8,180,891 | B1* | 5/2012 | Harrison | ................. | H04L 63/10 709/224 |
| 8,539,072 | B1* | 9/2013 | Harrison | ................. | H04L 63/10 709/224 |
| 2002/0069278 | A1* | 6/2002 | Forslow | .............. | H04L 63/0227 709/225 |
| 2003/0154306 | A1* | 8/2003 | Perry | ................ | H04L 29/12009 709/245 |
| 2003/0172145 | A1* | 9/2003 | Nguyen | ................. | G06Q 10/10 709/223 |
| 2003/0224788 | A1* | 12/2003 | Leung | ................. | H04L 12/4633 455/435.1 |
| 2004/0100976 | A1* | 5/2004 | Chang | ............... | H04L 29/12066 370/401 |
| 2005/0021841 | A1* | 1/2005 | Yoshimoto | ........ | H04L 29/12066 709/238 |
| 2007/0199062 | A1* | 8/2007 | Cho | .................. | H04L 29/12377 726/12 |
| 2010/0118869 | A1* | 5/2010 | Li | ..................... | H04L 29/12066 370/389 |
| 2012/0117649 | A1* | 5/2012 | Holloway | ........... | H04L 63/1416 726/24 |
| 2012/0158898 | A1* | 6/2012 | van Deventer | ......... | H04W 4/02 709/217 |
| 2012/0282924 | A1* | 11/2012 | Tagg | ..................... | H04W 48/18 455/432.1 |

OTHER PUBLICATIONS

"Payment Card Industry (PCI) Data Security Standard, Requirements and Security Assessment Procedures", PCI Security Standards Council, Version 1.2, Oct. 2008.

* cited by examiner

SYSTEM ARCHITECTURE FOR DMZ EXTERNAL IP ADDRESSES

CROSS-REFERENCES TO RELATED APPLICATIONS

This application is a continuation application of U.S. patent application Ser. No. 13/298,811, filed Nov. 17, 2011, which claims the benefit of U.S. Provisional Application No. 61/414,496, filed Nov. 17, 2010, which is incorporated herein by reference in its entirety.

BACKGROUND

The present application relates generally to a system architecture for securing a data environment. It finds particular application in conjunction with a cardholder data environment and will be described with particular reference thereto. However, it is to be appreciated that the present invention is also amenable to other types of data environments.

Electronic commerce, or e-commerce as it is otherwise known, relates to the buying and selling of products and services between consumers and merchants over the Internet. The convenience of shopping over the Internet has sparked considerable interest in e-commerce on behalf of both consumers and merchants. Internet sales, or like transactions, have typically been carried out using standard credit cards, such as VISA, MASTERCARD, DISCOVER, AMERICAN EXPRESS, and the like, or standard debit cards, such as check cards or automated teller machine (ATM) cards which directly access funds from an associated deposit account or other bank account.

Typically, a plurality of parties, such as merchants, payment gateways, acquirers/processors, issuers, and so on, is involved in processing e-commerce transactions. Each of these parties is represented by an internal, internet protocol (IP) network formed from a plurality of hosts, such as computers and servers, each having an IP address. An IP address is a unique number, such as a 32-bit or 128-bit number, that identifies the location of a host on an IP network. While processing e-commerce transactions, these parties exchange a number of communications with each other over an external, IP network, such as the Internet. As with the internal networks, the external network is formed from a plurality of hosts, such as computers and servers, identified by IP addresses.

To connect the internal networks and the external network, network address translation (NAT) is typically employed. Developed by CISCO, NAT is used by a device (e.g., a firewall or router) that sits between the internal network and the external network. NAT allows the device to act as an agent between the internal network and the external network. In that regard, the device translates between IP addresses of the internal network and IP addresses of the external network. For example, the device may receive data packet destined for an IP address of the external network, change the destination IP address of the data packet to the IP address of the internal network, and forward the modified data packet to the IP address of the internal network.

One challenge with communicating over an external network, such as the Internet, is security. The data exchanged between the parties includes payment information, such as credit card numbers, which can be of great value to potential attackers. One approach for mitigating the risk of payment information or other sensitive information falling in to the hands of attackers is to segregate an internal network into a cardholder data environment and a demilitarized zone (DMZ) to intermediate the cardholder data environment and the external network. A cardholder data environment is a network that possesses cardholder data or sensitive authentication data and those hosts and segments that directly attach or support cardholder processing, storage, or transmission. All other hosts of the internal network are added to the DMZ. These hosts are suitably employed to communication with hosts of the external network.

A firewall intermediate the DMZ and the cardholder data environment controls the flow of traffic between the DMZ and the cardholder data environment. The firewall allows limited connectivity between the DMZ and the cardholder data environment so the hosts of the DMZ can partially or wholly offload the processing of communications received from the external network to the cardholder data environment. By employing a firewall intermediate the DMZ and the cardholder data environment, even if an attacker compromises a host in the DMZ, the cardholder data environment is still secure.

The payment card industry data security standard (PCI DSS) is a set of requirements designed to ensure that all parties that process, store or transmit credit card information maintain a secure data environment. The PCI DSS is administered and maintained by the Payment Card Industry Security Standards Council (PCI SSC). The PCI SSC is an independent body that was launched in 2006 by the major payment card brands, such as VISA, MASTERCARD, AMERICAN EXPRESS, DISCOVER and JCB, to manage the ongoing evolution security standards in the Payment Card Industry (PCI) with focus on improving payment account security throughout the transaction process. For information regarding the PCI DSS, see www.pcisecuritystandards.org.

One requirement of the PCI DSS v1.2, section 1.3.5, is to "[r]estrict outbound traffic from the cardholder data environment to the Internet such that outbound traffic can only access IP addresses within the DMZ." As noted above, a cardholder data environment is a network that possesses cardholder data or sensitive authentication data and those hosts and segments that directly attach or support cardholder processing, storage, or transmission. A typical approach of meeting this requirement is with HTTP proxies in the DMZ. However, such an approach is invasive when using SSL with payment specific certificates. This is further complicated since keys for the certificates are typically stored in hardware security modules (HSMs). The HTTP proxy approach would require several HSMs, each costing approximately $30,000, in the DMZ.

The present invention provides a new and improved method, which overcomes the above-referenced problems and others.

INCORPORATION BY REFERENCE

The following commonly assigned applications, the disclosures of each being completely incorporated herein by reference, are mentioned:

U.S. Pat. No. 7,051,002 entitled "Universal Merchant Platform for Payment Authentication," by Keresman, III et al.; and, U.S. Pat. No. 7,693,783 entitled "Universal Merchant Platform for Payment Authentication," by Balasubramanian et al.

BRIEF DESCRIPTION

In accordance with an aspect of the present disclosure, a system of a first network, which is intermediate a second network and a third network, connects a host of the second network to a host of the third network. The system includes at least one processor programmed to receive a domain name service (DNS) request for a hostname corresponding to the host of the third network from the host of the second network. An internet protocol (IP) address of the first network allocated and an IP address of the host of the third network is determined from the hostname. The allocated IP address is mapped to the determined IP address and the allocated IP address is returned to the host of the second network in response to the DNS request.

In accordance with an aspect of the present disclosure, a system architecture secures a data environment from an external network. The system architecture includes a data environment and a demilitarized zone (DMZ) between the data environment and the external network. The DMZ includes a at least one processor programmed to receive a domain name service (DNS) request for a hostname corresponding to a host of the external network from a host of the data environment. An internet protocol (IP) address of the DMZ is allocated and an IP address of the host of the external network is determined from the hostname. The allocated IP address is mapped to the determined IP address and the allocated IP address is returned to the host of the data environment in response to the DNS request.

In accordance with an aspect of the present disclosure, a method performed by a system of a first network, which is intermediate a second network and a third network, connects a host of the second network to a host of the third network. A domain name system (DNS) request is received for a hostname corresponding to the host of the third network from the host of the second network. Using at least one processor, an internet protocol (IP) address of the first network is allocated, an IP address of the host of the third network is determined from the hostname, and the allocated IP address is mapped to the determined IP address. The allocated IP address is returned to the host of the second network in response to the DNS request.

DETAILED DESCRIPTION

Figure 1:
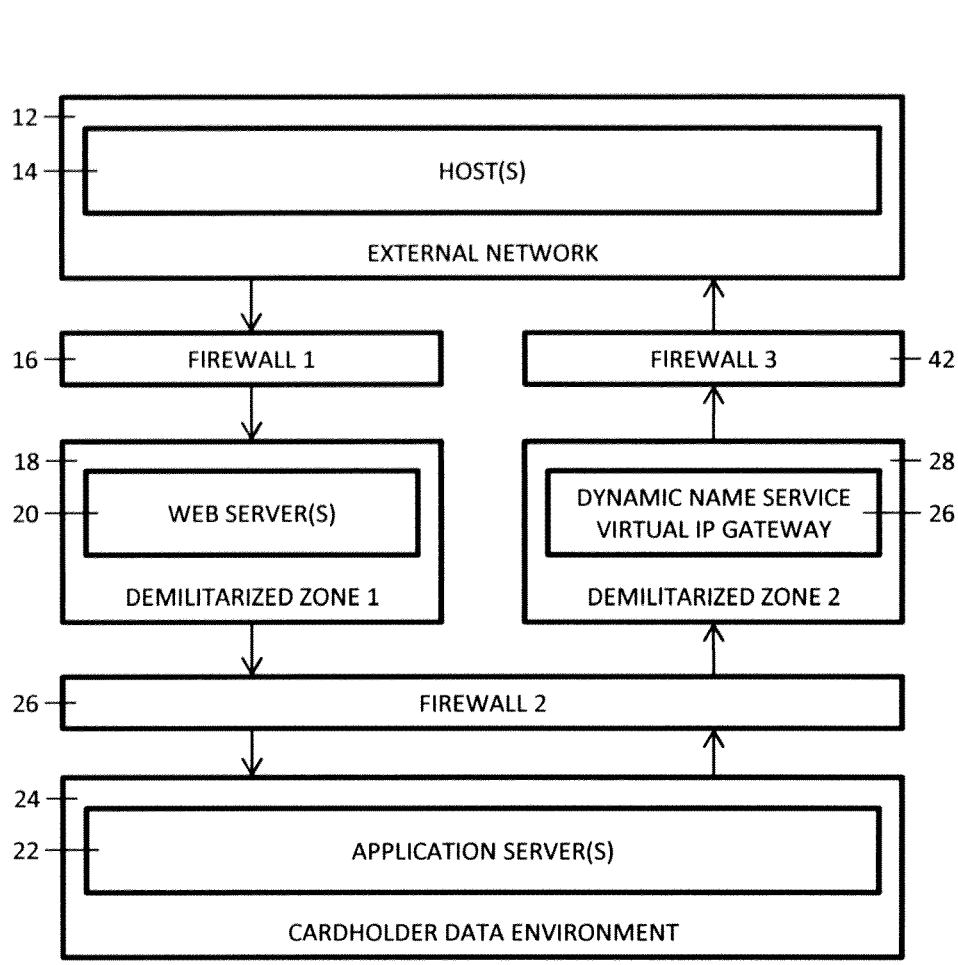
FIG. 1 is a block diagram of a system architecture for securing a cardholder data environment.

With reference to FIG. 1, an exemplary system architecture 10 includes an external, untrusted network 12, such as the Internet. The external network 12 is external to a party, such as a merchant, a payment gateway, an acquirer/processor, an issuer, and so on, providing an e-commerce service, to one or more hosts 14 forming the external network 12. The hosts 14 can be one or more of computers, servers, and so on. Further, each of the hosts 14 includes an internet protocol (IP) address of the external network 12. For example, an IP address of the external network 12 can be any IP address of the network defined by the subnet mask of 0.0.0.0.

A first firewall 16, intermediate the external network 12 and a first DMZ 18, provides limited connectivity between the external network 12 and the first DMZ 18. The first firewall 16 includes one or more IP addresses of the external network 12 and an IP address of the first DMZ 18. The first firewall 16 forwards data received at the IP addresses of the external network 12 to IP addresses of one or more hosts 20 forming the first DMZ 18, typically correspondingly and/or using network address translation (NAT). Further, the first firewall 16 only allows connections from the external network 12 to the first DMZ 18. Any other connections, such as connections from the first DMZ 18 to the external network 12, are prohibited. Suitably, this is performed using access control lists (ACLs), but other ways of limiting connectivity between the external network 12 and the first DMZ 18 are contemplated.

The hosts 20 of the first DMZ 18 can be one or more of computers, servers, such as web servers, and so on. Further, each of the hosts 20 of the first DMZ 18 includes an IP address of the first DMZ 18. For example, the IP addresses of the first DMZ 18 may be those defined by the network prefix of 172.16.0.0 and subnet mask of 255.240.0.0. The hosts 20 of the first DMZ 18 receive requests for the service from the external network 12 via the first firewall 16. In response to a request, the hosts 20 process the request and submit a response thereto based on the processing. To process a request, the hosts 20 of the first DMZ 18 submit at least one request to one or more hosts 22 forming a cardholder data environment 24, discussed hereafter, to partially or wholly process the request. In that regard, the hosts 20 of the first DMZ 18 offload all or part of the processing of each request to the hosts 22 of the cardholder data environment 24.

A second firewall 26, intermediate the cardholder data environment 24 and the first DMZ 18, provides limited connectivity between the first DMZ 18 and the cardholder data environment 24. The second firewall 26 only allows inbound connections from the first DMZ 18 to the cardholder data environment 24. Any other connections, such as connections from the cardholder data environment 24 to the first DMZ 18, are prohibited. The second firewall 26 suitably limits connectivity using ACLs. However, other ways of limiting connectivity between the first DMZ 18 and the cardholder data environment 24 are contemplated.

The hosts 22 of the cardholder data environment 24 can be one or more of computers, servers, such as application servers, and so on. Further, each of the hosts 22 of the cardholder data environment 24 includes an IP address of the cardholder data environment 24. For example, the IP addresses of the cardholder data environment 24 may be those defined by the network prefix of 192.168.0.0 and subnet mask of 255.255.0.0. Typically, the hosts 22 of the cardholder data environment 24 have access to sensitive data that draws the attention of attackers on the external network 12. For example, where a merchant employs the system architecture 10, the hosts 22 of the cardholder data environment 24 may have access to payment information, such as credit card numbers, of consumers that have done business with the merchant. Therefore, security is of great importance.

Further, the hosts 22 of the cardholder data environment 24 typically implement any complex business logic required by the service. For example, the hosts 22 of the cardholder data environment 24, such as application servers, may implement a universal merchant platform (UMP), as described in U.S. Pat. Nos. 7,051,002 and 7,693,783, both of which are incorporated herein by reference. The UMP provides a centralized merchant processing system for authenticated payments. It allows a merchant to securely and easily accommodate authentication of consumers and/or cardholders in accordance with a variety of authentication initiatives implemented by payment networks. Further, it allows merchants to process electronic transactions through any payment network using a single platform.

The hosts 22 of the cardholder data environment 24 receive requests from the first DMZ 18, process the requests and respond to the requests based on the processing. To process requests, the hosts 22 of the cardholder data environment 24 must typically communicate with the hosts 14 of the external network 12. However, outbound connections by way of the first DMZ 18 are prohibited. Further, the PCI DSS v1.2, section 1.3.5, requires restricting outbound traffic from the cardholder data environment 24 to the external network 12 such that outbound traffic can only access IP addresses within a DMZ. Therefore, the hosts 22 of the cardholder data environment 24 communicate with hosts 14 of the external network 12 via a Dynamic name service Virtual IP (VIP) Gateway (DVG) 26 of a second DMZ 28, hereafter discussed in detail.

In order for a host of the cardholder data environment 24 to communicate with a host of the external network 12 via the DVG 26, the host of the cardholder data environment 24 submits a DNS request for the hostname of the host of the external network 12 to the DVG 26. In response to the DNS request, the DVG 26 returns an IP address of the second DMZ 28, which is mapped to the host of the external network 12, typically using destination network address transaction DNAT. The host of the cardholder data environment 24 then communicates with the host of the external network 12 via this IP address. That is to say, communication with the host of the external network 12 is not performed with the IP address for the host of the external network 12. Rather, communication with the host of the external network 12 is performed with the IP address returned by the DNS request.

The second firewall 26 is further employed between the cardholder data environment 24 and the second DMZ 28. It includes an IP address of the second DMZ 28 and an IP address of the cardholder data environment 24. Further, it provides limited connectivity between the cardholder data environment 24 and the second DMZ 28. The second firewall 26 forwards data received from the cardholder data environment 24, which is destined for the second DMZ 28, to the second DMZ 28. Further, the second firewall 26 only allows outbound connections from the cardholder data environment 24 to the second DMZ 28. Any other connections, such as connections from the second DMZ 28 to the cardholder data environment 24, are prohibited. As noted above, the second firewall 26 suitably limits connectivity using ACLs. However, other ways of limiting connectivity between the second DMZ 28 and the cardholder data environment 24 are contemplated.

The DVG 26 of the second DMZ 28 includes one or more hosts. The hosts can be one or more of computers, servers, and so on. Further, each of the hosts includes an IP address of the second DMZ 28. For example, the IP addresses of the second DMZ 28 may be those defined by the network prefix of 10.0.0.0 and subnet mask of 255.0.0.0. The hosts of the DVG 26 execute software to allow the hosts 22 of the cardholder data environment 24 communicate with hosts 14 of the external network 12.

The software implements a DNS server for processing DNS requests from the hosts 22 of the cardholder data environment 24. Each DNS request identifies a host of the external network 12 by a hostname. Upon receiving a DNS request, an unused IP within the second DMZ 28 is allocated. The IP is virtual because the address is not bound to an interface. In response to the DNS request, the DNS server returns the allocated IP address to the host of the cardholder data environment 24. The software further implements a gateway. The gateway forwards data destined for allocated IP addresses to corresponding IP addresses of hosts of the external network 12, typically using DNAT. The IP address of a host of the external network 12 is determined by submitting a DNS request for the hostname to a DNS server (i.e., a host) of the external network 12. Typically, after a predetermined period of inactivity on an allocated IP address, the IP address is deallocated.

Figure 2:
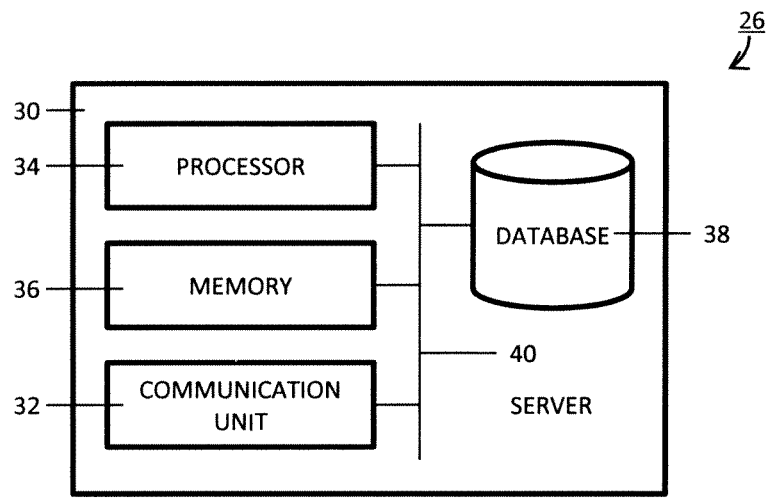
FIG. 2 is a block diagram of an embodiment of Dynamic name service, Virtual IP (VIP) Gateway (DVG); and, FIG. 3 is a block diagram of the flow of messages through the system architecture.

With reference to FIG. 2, a block diagram of an embodiment of the DVG 26 including a single host 30 is provided. The host 30 includes a communication unit 32 for communicating with the second DMZ 28 and the external network 12. Further, the host 30 includes at least one processor 34 executing computer executable instructions (i.e., the above described software) stored on at least one memory 36 of the host 30. The instructions, when executed, suitably facilitate communication between a host of the cardholder data environment 24 and a host of the external network 12, as described above. Even more, the host 30 includes a database 38 for tracking allocations of IP addresses. Each record includes at least the allocated IP address and the corresponding hostname. The components of the host 30 are interconnected with at least one data bus 40.

Referring back to FIG. 1, a third firewall 42, intermediate the external network 12 and the second DMZ 28, provides limited connectivity between the external network 12 and the second DMZ 28. The third firewall 42 includes an IP address of the external network 12 and an IP address of the second DMZ 28. The third firewall 42 forwards data received from the second DMZ 28, which is destined for the external network 12, to the external network 12. Further, the third firewall 42 only allows connections from the second DMZ 28 to the external network 12. Any other connections, such as connections from the external network 12 to the second DMZ 28, are prohibited. Suitably, this is performed using ACLs, but other ways of limiting connectivity between the external network 12 and the second DMZ 28 are contemplated.

Figure 3:
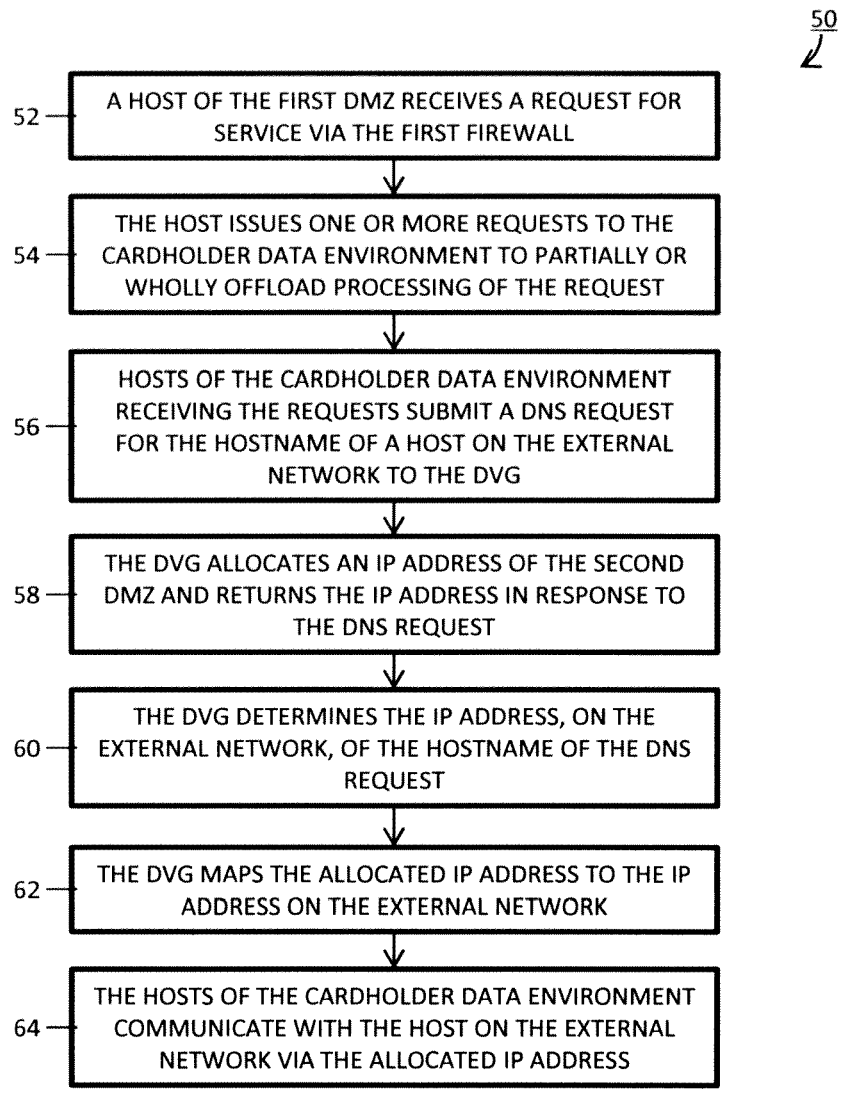

With reference to FIG. 3, a block diagram of a method 50 of operation of the system architecture 10 is provided. Initially, one of the hosts 20 of the first DMZ 18 receives a request for the service from one of the hosts 14 of the external network 12 (Action 52). The request suitably passes through the first firewall 16 using, for example, NAT. Where NAT is employed, the request may be received at an IP address of the external network 12 assigned to the first firewall 16. The first firewall 16 then uses NAT to pass the request to an IP address of the first DMZ 18 assigned to the one of the hosts 20 of the first DMZ 18. The first firewall 16 further allows only connections from the external network 12 to the first DMZ 18.

The host of the first DMZ 18 processes the received request and responds thereto. In processing the request, the host of the first DMZ 18 issues one or more requests to the cardholder data environment 24 to partially or wholly offload processing (Action 54). The requests issued to the cardholder data environment 24 pass through the second firewall 26, which, as between the first DMZ 18 and the cardholder data environment 24, only allows connections from the first DMZ 18 to the cardholder data environment 24.

One or more hosts of the cardholder data environment 24 receive the requests from the host of the first DMZ 18, process the requests and respond to the requests. In processing the requests, these hosts suitably require communication with other parties over the external network 12. To communicate with another party over the external network 12, these hosts submit a DNS request for the hostname associated with the other party to the DVG 26, which is located in the second DMZ 28 (Action 56). Communications with the second DMZ 28 pass through the second firewall 26, which, as between the second DMZ 18 and the cardholder data environment 24, only allows connections from the cardholder data environment 24 to the second DMZ 28.

In response to the DNS request, the DVG 26 allocates an unused IP addressed within the second DMZ 28 and responds with the allocated IP address (Action 58). The IP is virtual because the address is not bound to an interface. The DVG 26 further determines the IP address of the hostname corresponding to the DNS request, which is part of the external network 12 (Action 60). Suitably the IP address of the hostname is determined using a DNS server of the external network 12. Even more, the DVG 26 maps the allocated IP address to the IP address of the external network (Action 62). Communication between the second DMZ 28 and the external network 12 passes through a third firewall 42, which only allows connections from the second DMZ 28 to the external network 12.

The hosts of the cardholder data environment 24 receive the response to the DNS request and communicate with the host of the external network 12 associated with the hostname of the DNS request via the allocated IP address (Action 64). When a communication is submit to the allocated IP address, the DVG 26 receives the request and forwards it to the corresponding host of the external network 12. Typically, this is performed using DNAT. For example, the DVG 26 modifies the destination address of data packet received on the allocated IP address to match the IP address of the host of the external network 12 and forwards the modified data packet to the this host.

In view of the foregoing, the system architecture 10, when employed by companies that process, store or transmit credit card information, meets the section 1.3.5 requirement of the payment card industry data security standard (PCI DSS) v1.2. Particularly, the system architecture restricts outbound traffic from the cardholder data environment to the Internet such that outbound traffic can only access IP addresses within the DMZ. Further, while the present disclosure may appear similar to destination network address translation (DNAT) and DNS doctoring, it differs in several key respects.

DNAT is a technique for transparently changing the destination IP address of an en-route packet and performing the inverse function for any replies. Any router situated between two endpoints can perform this transformation of the packet. DNAT is commonly used to publish a service located in a private network on a publicly accessible IP address. The typical way DNAT is used is to map one subnet to an equivalent sized subnet, where the subnet may be a single IP. The present disclosure is different. At a high level, it maps a larger subnet mask (e.g., 0.0.0.0) to a much smaller subnet (e.g., 255.0.0.0). At a low level, this is accomplished with DNATs that are dynamically allocated.

DNS doctoring is used by CISCO firewalls to translate DNS requests. Specifically, if the firewall has a NAT entry and a DNS request is made through the firewall, it will translate the DNS request to the NATed address. The DNS doctoring feature of a CISCO firewall inspects the data payload of the DNS replies and changes the type A DNS record (IP address sent by the DNS server) to an address specified in the NAT configuration. However, this does not meet the section 1.3.5 requirement the PCI DSS v1.2. With DNS doctoring, the NAT is driving the DNS translation. In the present disclosure, however, the DNS is driving the NAT. The distinction is important due to the dynamic nature of the DNATs. The DNAT would not exist yet when the DNS request was made, possibly creating a race condition.

It is to be appreciated that suitably, the methods and systems described herein are embodied by a computer, or other digital processing device including a digital processor, such as a microprocessor, microcontroller, graphic processing unit (GPU), etc. and storage. In other embodiments, the systems and methods may be embodied by a server including a digital processor and including or having access to digital data storage, such server being suitably accessed via the Internet or a local area network, or by a personal data assistant (PDA) including a digital processor and digital data storage, or so forth. The computer or other digital processing device suitably includes or is operatively connected with one or more user input devices, such as a keyboard, for receiving user input, and further includes, or is operatively connected with, one or more display devices. In other embodiments, the input for controlling the methods and systems is received from another program running previously to or concurrently with the methods and systems on the computer, or from a network connection, or so forth. Similarly, in other embodiments the output may serve as input to another program running subsequent to or concurrently with methods and systems on the computer, or may be transmitted via a network connection, or so forth.

In some embodiments, the exemplary methods, discussed above, the system employing the same, and so forth, of the present application are embodied by a storage medium storing instructions executable (for example, by a digital processor) to implement the exemplary methods and/or systems. The storage medium may include, for example: a magnetic disk or other magnetic storage medium; an optical disk or other optical storage medium; a random access memory (RAM), read-only memory (ROM), or other electronic memory device or chip or set of operatively interconnected chips; an Internet server from which the stored instructions may be retrieved via the Internet or a local area network; or so forth.

It is to further be appreciated that in connection with the particular exemplary embodiments presented herein certain structural and/or functional features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the invention or the equivalents thereof. That is to say, it will be appreciated that various of the above-disclosed and other features and functions, or alternatives thereof, may be desirably combined into many other different systems or applications, and also that various presently unforeseen or unanticipated alternatives, modifications, variations or improvements therein may be subsequently made by those skilled in the art which are similarly intended to be encompassed by the invention.

The invention claimed is:

1. A system for enhancing data security comprising:
at least one processor programmed to:
receive a request for an e-commerce service from a host of an external network;
receive a request to offload processing from a first demilitarized zone (DMZ), wherein the request to offload processing is associated with offloading processing of the request for the e-commerce service from the host of the external network;
communicate a domain name service (DNS) request for a hostname corresponding to the host of the external network to a host of a data environment;
allocate an internet protocol (IP) address of a second DMZ in response to receiving the DNS request;
determine an IP address of the host of the external network from the hostname corresponding to the host of the external network;
map the allocated IP address of the second DMZ to the determined IP address of the host of the external network by mapping a larger subnet mask to a smaller subnet mask;
communicate data associated with the request for the e-commerce service to the second DMZ; and
communicate data associated with the request for the e-commerce service to the host of the external network after the first DMZ receives the data associated with the request for the e-commerce service from the host of the data environment.

2. A method for enhancing data security comprising:
receiving, with at least one processor, a request for an e-commerce service from a host of an external network;
receiving, with at least one processor, a request to offload processing from a first demilitarized zone (DMZ), wherein the request to offload processing is associated with offloading processing of the request for the e-commerce service from the host of the external network;
communicating, with at least one processor, a domain name system (DNS) request for a hostname corresponding to the host of the external network to a host of a data environment based on receiving the request to offload processing from the first DMZ;
allocating, with at least one processor, an internet protocol (IP) address of a second DMZ based on the DNS request;
mapping, with at least one processor, an allocated IP address of the second DMZ to an IP address of the host of the external network;

communicating, with at least one processor, data associated with the request for the e-commerce service to the second DMZ; and
communicating, with at least one processor, data associated with the request for the e-commerce service to the host of the external network after the first DMZ receives the data associated with the request for the e-commerce service from the host of the data environment.

3. The system of claim 1, wherein the at least one processor is further programmed or configured to:
after a predetermined period of inactivity on the allocated IP address, deallocate the allocated IP address.

4. The system of claim 1, wherein the at least one processor is further programmed or configured to:
map the larger subnet mask to the smaller subnet mask using destination network address translations (DNATs) that are dynamically allocated.

5. The system of claim 1, wherein the at least one processor is further programmed or configured to:
receive the DNS request via a second firewall, wherein the second firewall is configured to allow only outbound connections from the data environment to the second DMZ.

6. The system of claim 1, wherein the at least one processor is further programmed or configured to:
receive the DNS request via a second firewall, wherein the second firewall is configured to allow only outbound connections from the data environment to the second DMZ; and
communicate with the external network through a third firewall, wherein the third firewall is configured to only allow connection from the second DMZ to the external network.

7. The system of claim 1, wherein, when determining the IP address of the host of the external network, the at least one processor is programmed or configured to:
perform a DNS lookup of the hostname corresponding to the host of the external network.

8. The system of claim 7, wherein, when performing the DNS lookup of the hostname corresponding to the host of the external network, the at least one processor is programmed or configured to:
perform the DNS lookup of the hostname corresponding to the host of the external network with a DNS server of the external network.

9. The method of claim 2, wherein communicating the data associated with the request for the e-commerce service to the host of the external network comprises:
communicating between the host of the data environment and the host of the external network via the allocated IP address.

10. The method of claim 2, further comprising:
after a predetermined period of inactivity on the allocated IP address, deallocating the allocated IP address.

11. The method of claim 2, further comprising:
communicating the request for the e-commerce service to an IP address of the first DMZ assigned to a host of the first DMZ using network address translation (NAT).

12. The method of claim 2, further comprising:
allowing connections from the second DMZ to the external network; and
prohibiting connections from the external network to the second DMZ.

13. The method of claim 2, further comprising:
determining an IP address of the host of the external network from the hostname.

14. The method of claim 2, wherein determining the IP address of the host of the external network comprises:
performing a DNS lookup of the hostname corresponding to the host of the external network with a DNS server of the external network.

15. A computer program product for enhancing data security, the computer program product comprising at least one non-transitory computer-readable medium including one or more instructions that, when executed by at least one processor, cause the at least one processor to:
receive a domain name system (DNS) request for a hostname corresponding to a host of an external network from a host of a data environment;
allocate an internet protocol (IP) address of a demilitarized zone (DMZ) in response to receiving the DNS request;
determine an IP address of the host of the external network from the hostname;
map the allocated IP address of the DMZ to the determined IP address of the host of the external network;
return the allocated IP address of the DMZ to the host of the data environment in response to the DNS request; and
communicate data associated with a request for an e-commerce service to the host of the external network based on data associated with the request for the e-commerce service received from the host of the data environment.

16. The computer program product of claim 15, wherein the one or more instructions further cause the at least one processor to:
after a predetermined period of inactivity on an allocated IP address, deallocating the allocated IP address.

17. The computer program product of claim 15, wherein, the one or more instructions that cause the at least one processor to map the allocated IP address of the DMZ to the determined IP address of the host of the external network, cause the at least one processor to:
map a larger subnet mask to a smaller subnet mask.

18. The computer program product of claim 15, wherein the one or more instructions further cause the at least one processor to:
receive the DNS request via a firewall, wherein the firewall is configured to allow only outbound connections from the data environment to the DMZ.

19. The computer program product of claim 15, wherein the one or more instructions further cause the at least one processor to:
communicate with the external network through a second firewall, wherein the second firewall is configured to only allow connection from the DMZ to the external network.

20. The computer program product of claim 15, wherein the one or more instructions that cause the at least one processor to determine the IP address of the host of the external network, cause the at least one processor to:
perform a DNS lookup of the hostname corresponding to the host of the external network with a DNS server of the external network.

* * * * *